(12) United States Patent
Gonzaga

(10) Patent No.: US 6,470,923 B1
(45) Date of Patent: Oct. 29, 2002

(54) INFLATION OF TIRES WITH DEOXYGENATED AIR

(75) Inventor: Tullio Gonzaga, Correggio (IT)

(73) Assignee: Butler Engineering & Marketing S.r.l., Rio Saliceto (IT)

( * ) Notice: Subject to any disclaimer, the term of this patent is extended or adjusted under 35 U.S.C. 154(b) by 0 days.

(21) Appl. No.: 09/619,658

(22) Filed: Jul. 19, 2000

(30) Foreign Application Priority Data

Jul. 30, 1999 (IT) .......................................... VR99A0061

(51) Int. Cl.$^7$ .............................................. B65B 31/00
(52) U.S. Cl. ................ 141/38; 141/4; 141/11; 141/37; 141/39; 141/47; 141/83; 152/415
(58) Field of Search ................ 141/4, 9, 11, 37–39, 141/47–49, 67, 83, 94, 95, 100, 382; 152/415, 427, 429; 55/342, 350.1, 315

(56) References Cited

U.S. PATENT DOCUMENTS

| | | | |
|---|---|---|---|
| 3,498,341 A | * 3/1970 | Spereberg ..................... 141/4 |
| 4,894,068 A | 1/1990 | Rice |
| 5,878,791 A | * 3/1999 | Kane ........................... 141/59 |
| 5,906,227 A | * 5/1999 | Sowry .......................... 141/65 |
| 5,967,198 A | * 10/1999 | Smalley ....................... 141/38 |

* cited by examiner

Primary Examiner—Timothy L. Maust
(74) Attorney, Agent, or Firm—Guido Modiano; Albert Josif; Daniel O'Byrne

(57) ABSTRACT

A device for program-controlled variation of the composition of a gaseous mixture for inflating a tire for performing the method, comprising a first source of at least one main gas, a second source of at least one additional gas, at least one first compressor suitable for compressing to a preset pressure a gaseous mixture of at least said main gas and additional gas, at least one dispenser of compressed mixture which is connected to the delivery of said compressor, and further comprising at least one mixer for said at least one main gas and said at least one additional gas which is suitable for delivering a gaseous mixture having a desired composition, a gas analyzer means arranged downstream of said mixer, valve means for controlling the flow between said mixer and said first and second gas sources, and program control means arranged to control said valve means in response to control signals from said analyzer means.

18 Claims, 6 Drawing Sheets

INFLATION OF TIRES WITH DEOXYGENATED AIR

BACKGROUND OF THE INVENTION

The present invention relates to the inflation of tires with oxygen-depleted air and to a method for varying the composition of a gas mixture for tire inflation.

It is known that tires, once fitted or refitted onto a wheel, are usually inflated by compressed air. Air inflation proper can occur either on the tire changing machine or within a receiving and protection cage for safety reasons. The compressed air used is usually fed through a supply line and suitably filtered. Inflating devices typically comprise an intake valve, an outlet valve and a pressure gauge for detecting the internal pressure of the tire.

Oxygen is present in air in a percentage of approximately 20% and is responsible for several undesirable effects. First of all, the $O_2$ molecules tend to escape from the tire by diffusion, and thus the inflation pressure will be eventually unstable. Accordingly, the trend is to use tires inflated below their optimum value or threshold inflation range, which causes faster tire wear and affects safety in driving of the vehicle. Secondly, the presence of oxygen, whose percentage increases in the presence of moisture, is responsible for oxidation of metallic components (wheelrim) that form a tire-wheel, thus causing faster aging thereof. Finally, oxygen, e.g. at concentrations higher than 12% and in the presence of heat, can cause explosions and thus fire.

To obviate these drawbacks, it has already been suggested to inflate tires with nitrogen alone, e.g. in racing vehicles and in aeronautics, but inflation with nitrogen entails not only nitrogen supply problems but also the use of bulky devices which as such are scarcely practical for daily use besides being highly expensive. As a matter of fact, nitrogen is usually marketed as a gas in large steel cylinders at high pressure (about 200 bar) or in liquid state. It is accordingly necessary to provide, at the site of use, a pressure reduction unit in the first case and an evaporator in the second case, and inflation with nitrogen always occurs after a pre-inflation with air performed during fitting of the tire on a tire changing machine.

Once it has been inflated, a tire is in every respect a thermodynamically open system which is subject to variations as to mass (m) and its state (p, T), since the tire behaves substantially like an osmotic membrane, i.e. exchange occurs between the environment inside the tire and the outside environment (atmosphere). Regardless of the type of gas mixture used to inflate a tire, migration of oxygen ($O_2$) occurs through the tire (in one direction or the other). The oxygen that passes through the mass of rubber-like material, besides damaging the structure of the tire (aging), also causes an unwanted variation in the inflation pressure originally generated during tire inflation.

When inflation is performed with atmospheric air (a gas mixture formed roughly by 20% $O_2$, 78% $N_2$ and 1% Ar and $CO_2$), for example, at a pressure p=3 bar and at an ambient temperature T=299° K., owing to the different partial pressures of the various gaseous components of the mixture (which generally increase as the overall inflation pressure increases) and the permeability of the rubber-like material that constitutes the tire, there occurs a slow migration of $O_2$ molecules from the inside toward the outside of the tire, which reduces the overall inflation pressure. As is known, this leads to less safe driving and to higher wear of the tire tread.

If instead inflation is performed with oxygen-depleted air, for example with $N_2$, temperature and inflation pressure being equal, a reverse migration of $O_2$ from the outside to the inside of the tire occurs eventually, thereby increasing the pressure with respect to the initial inflation pressure. In general, the lower the pressure difference between the inside and the outside of the tire, the more conspicuous is this effect.

SUMMARY OF THE INVENTION

The main object of the present invention is to eliminate or drastically reduce the above listed drawbacks and in particular those drawbacks related to the variation in inflation pressure caused by migration Of $O_2$ through the rubber material of the tire. More particularly, the aim is to take advantage of the phenomenon arising from the behavior of an oxygen-depleted inflation mixture, and since nitrogen passes through rubber at a slower rate than compressed air (of which approximately 20% is $O_2$), a tire inflated with nitrogen requires less frequent pressure checking and explosion is avoided.

According to a first aspect of the present invention, a tire inflation system is provided which has a compressor and at least one inflating nozzle or gun designed to be connected to a respective inlet for a tire and to control the fluid flow supplied thereto, and is characterized in that it comprises a source of oxygen-depleted air which is arranged upstream of said compressor and downstream of said nozzle or nozzles.

According to another aspect of the present invention, there is provided an inflation method which comprises varying the composition of air used for inflating a tire depending upon the inflation pressure recommended for a given tire.

More particularly, the method according to the present invention comprises decreasing the percentage of oxygen ($O_2$) as the inflation pressure required for the tire rises.

According to another aspect of the present invention, a device is provided for program-controlled variation in the composition of a gaseous mixture for inflating a tire, which includes a first source of at least one main gas, a second source of at least one additional gas, at least one compressor suitable for compressing to a preset pressure a gaseous mixture of at least said main gas and an additional gas, at least one dispenser of compressed mixture which is connected to the delivery of said compressor, and is characterized in that it comprises at least one mixer for said at least one main gas and said at least one additional gas which is suitable for dispensing a gaseous mixture having a desired composition, a gas analyzer means which is arranged downstream of said mixer, valve means for controlling flow between said mixer and said first and second gas sources, and program control means arranged to control said valve means in response to control signals from said analyzer means.

BRIEF DESCRIPTION OF THE DRAWINGS

Further aspects and advantages of the present invention will become better apparent from the following description of some currently preferred embodiments thereof, given with reference to the accompanying drawings, wherein.

DESCRIPTION OF THE PREFERRED EMBODIMENTS

Figure 1:
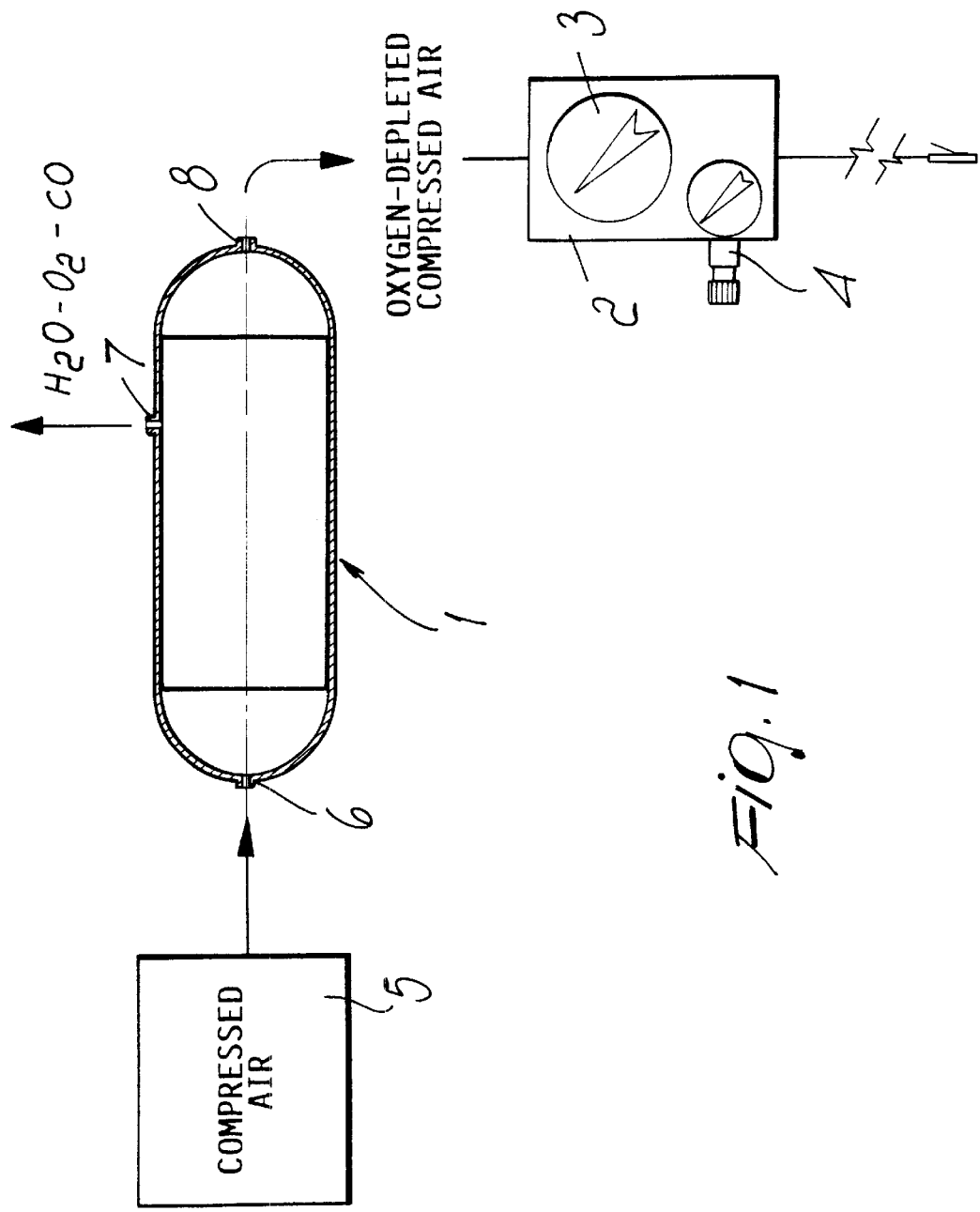
FIG. 1 is a block diagram of an inflating system according to the invention.

It is well-known that deoxygenated air, or air which is relatively oxygen-depleted, can be obtained by various methods and in particular by using one or more serially arranged membrane separators, as disclosed in U.S. Pat. No. 4,894,068 (Rice). By using such membrane separators, it is possible to separate from air highly permeable components, e.g. oxygen, carbon dioxide and water vapor, down to very low percentages on an industrial scale, e.g. down to 100 ppm of oxygen at 30° C., and by subjecting inlet air to a set of membrane separators at a pressure of about $8 \times 10^5$ Pa.

Since the pressure drop of the air at the outlet of a separator unit is very low, even negligible, according to the invention (see FIG. 1) it is suggested to use the outlet air from one or more membrane separators 1, either directly or through a reservoir (not shown in the drawings) of any suitable type, for tire inflation, e.g. by means of a conventional inflating gun 2, preferably provided with pressure gauge 3 and pressure reduction unit 4, which are standard equipment at fuel stations or tire centers.

Upstream of the membrane separator or separators 1 there is located a compressor 5 of any suitable type, which is arranged to feed compressed air through an intake 6 to the or each membrane separator 1, which discharges into the ambient air the above listed highly permeable air components through one or more outlets 7 and supplies deoxygenated or oxygen-depleted air to an outlet 8 communicating with a reservoir or directly with one or more inflating guns 2.

Figure 2:
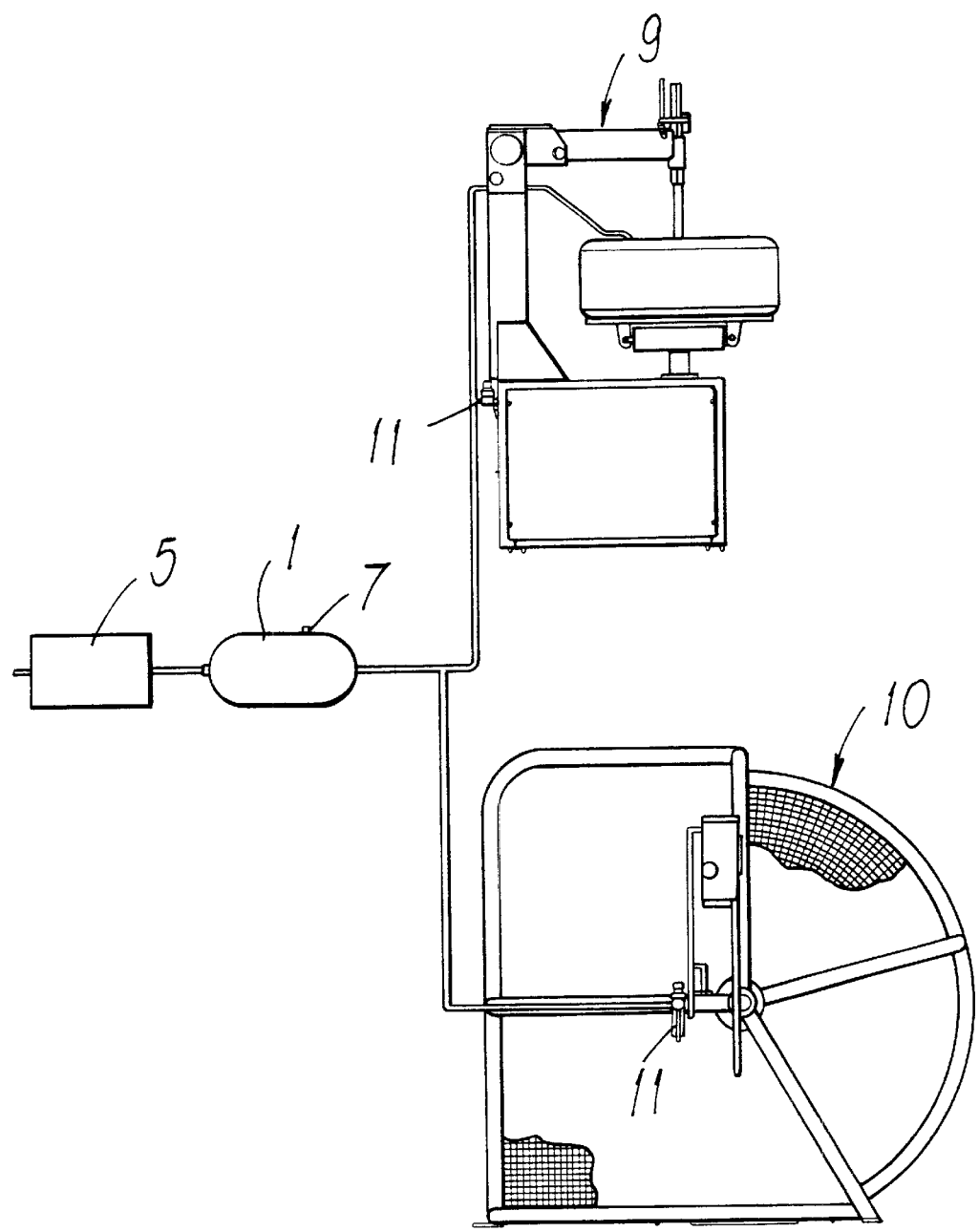
FIG. 2 is a schematic view of an inflating system according to the invention, which supplies one or more tire changing machines and one or more inflation cages.

FIG. 2 illustrates an inflation system similar to that of FIG. 1, but arranged to feed oxygen-depleted air to a tire changing machine 9 of any electromechanically- or pneumatically-operated type. In the latter case, the oxygen-depleted air supplied by the above described inflator can be advantageously used for operating of the tire changing machine 9 itself, for full benefit of the endurance and reliability of its oxidation-liable components, as well as for feeding an inflation cage 10, preferably through an adjustable pressure reduction valve 11.

Figure 3:
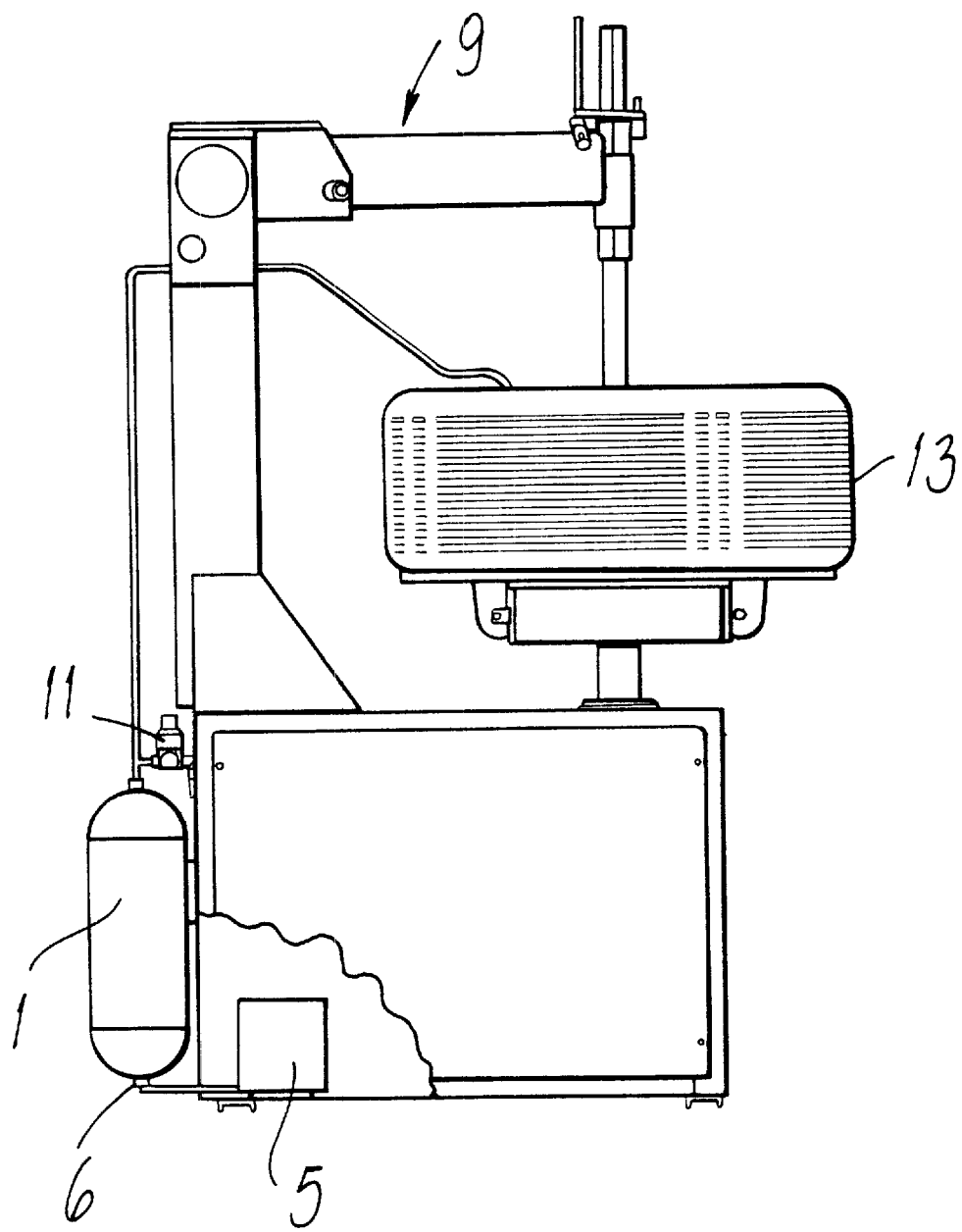
FIG. 3 is a schematic side elevation view of a tire changing machine with an onboard autonomous inflating system supplying deoxygenated or oxygen-depleted air according to the invention.
Figure 4:
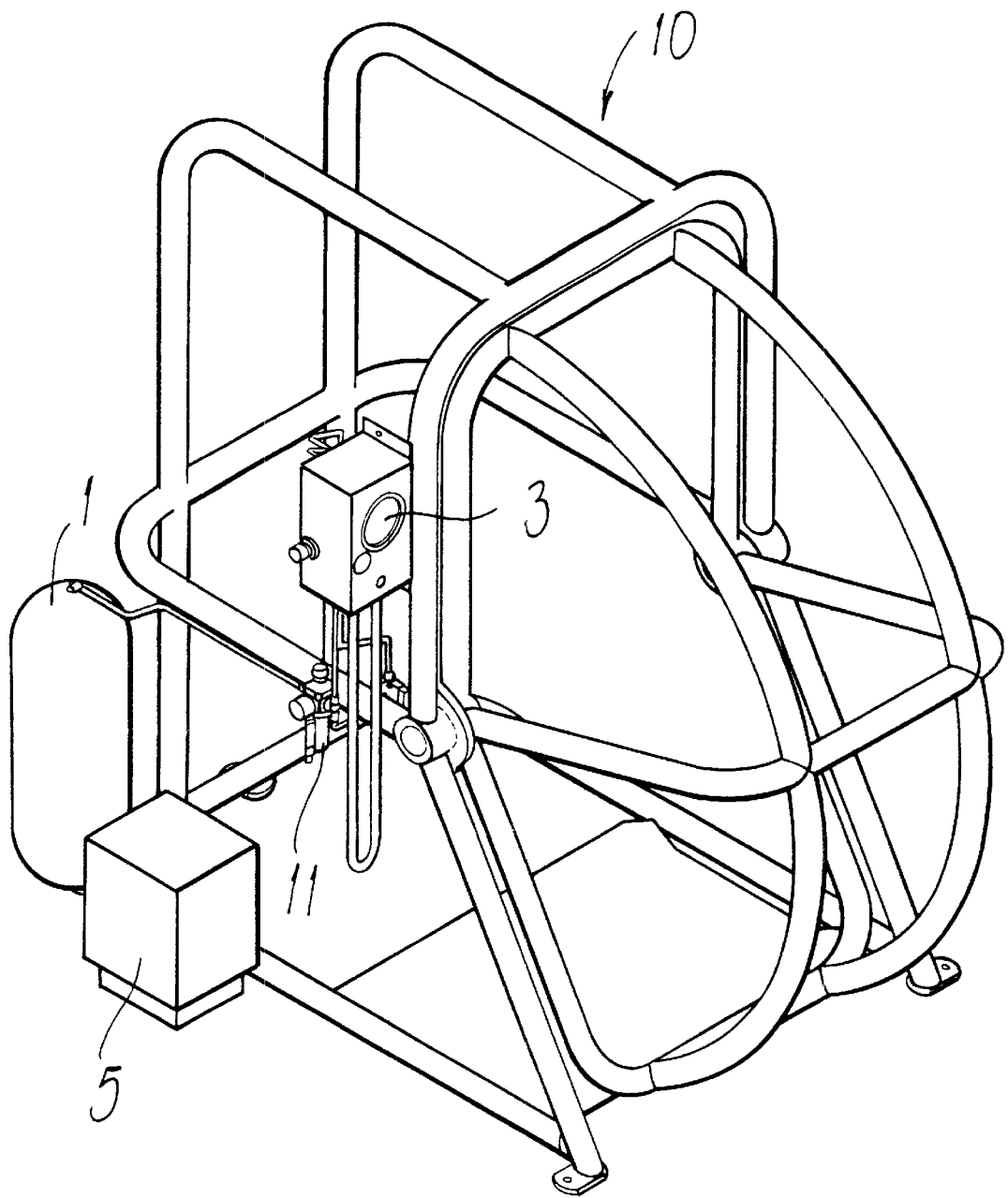
FIGS. 4 and 5 are schematic perspective views of an inflation cage and a balancing machine, respectively, with an onboard autonomous inflating system according to the present invention.
Figure 5:
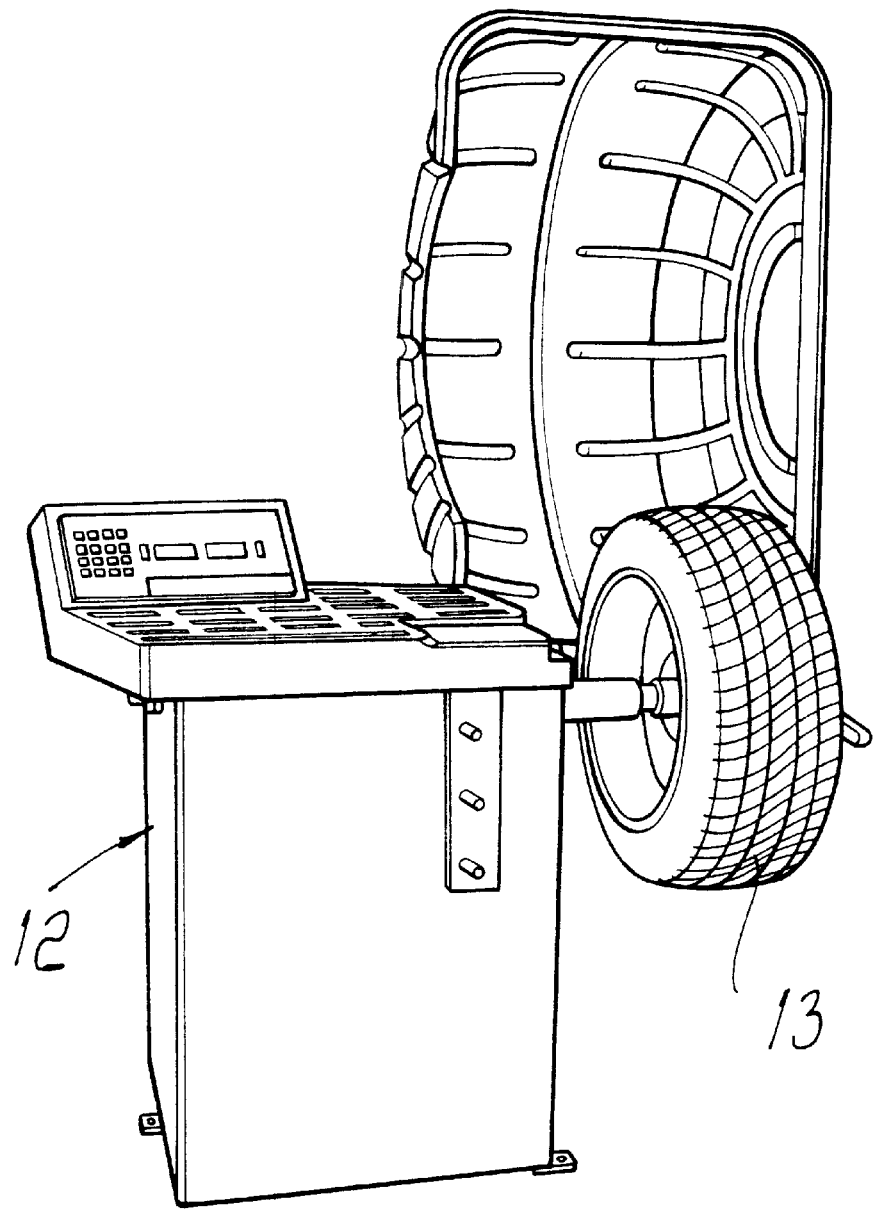

The inflation system for inflating a tire 13 with oxygen-depleted air can be suitably dimensioned for installation on a tire changing machine 9, as shown in FIG. 3, or on an inflation cage 10, as shown in FIG. 4, preferably with interposition of a pressure reduction valve 11, or on a balancing machine 12 (FIG. 5) of any suitable type.

Figure 6:
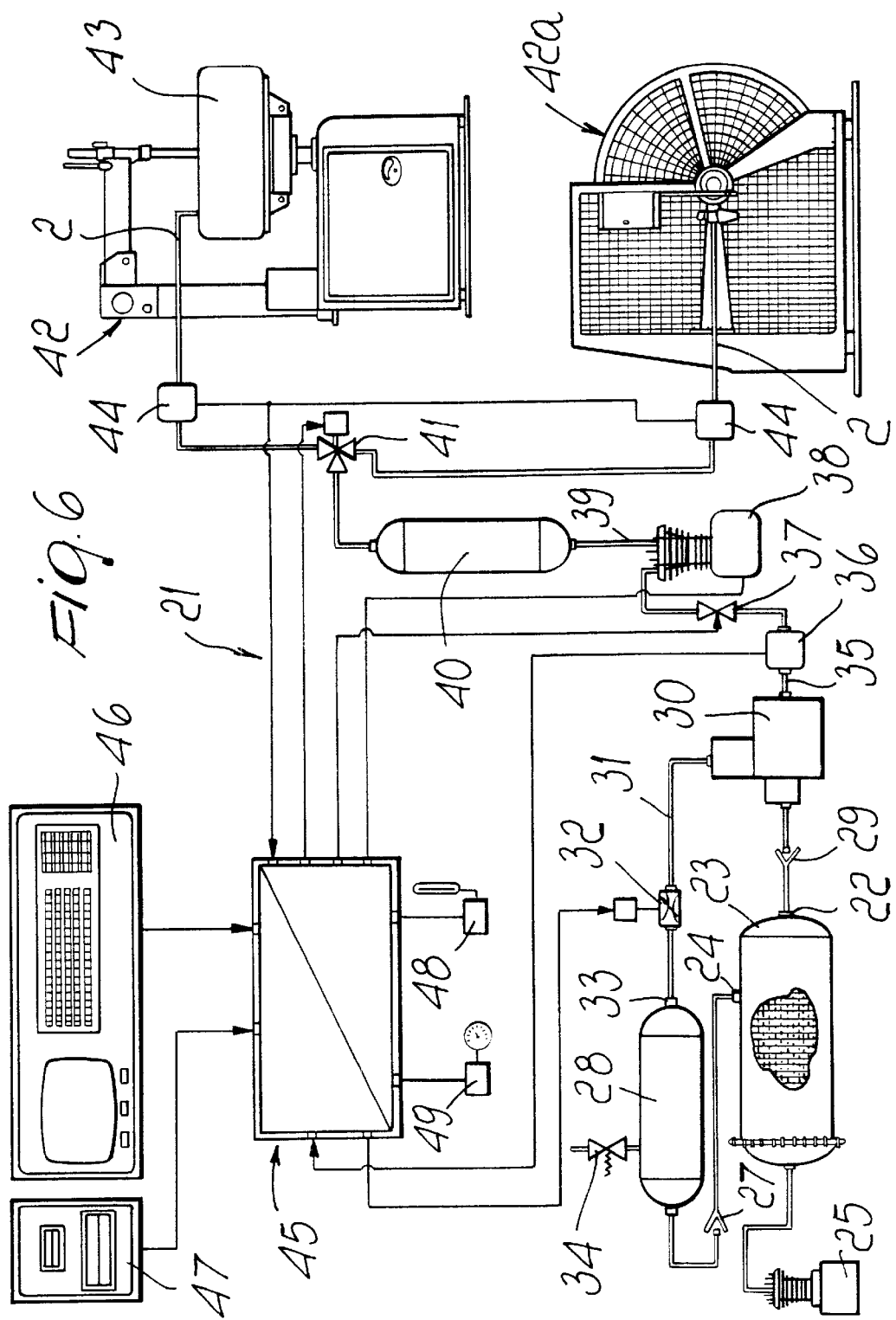
FIG. 6 is a schematic view of an inflation station provided with a tire changing machine and with an inflating system provided with an inflation cage.

With reference to FIG. 6, the numeral 21 generally designates a device for program-controlled variation of the composition of a gaseous inflation mixture, which comprises a first source of a main gas, e.g. formed by an outlet 22 of an oxygen separator 23 (e.g. the above described separator 1) and a source of an additional gas (oxygen) constituted by an outlet 24 of the oxygen separator 23. The latter is constituted by a fiber separator of any suitable type which is known per se in the art and is preferably connected to the delivery of a compressor 25. More particularly, the outlet 24 of the oxygen separator 23 can feed, through a one-way valve 27, a reservoir 28, while its outlet 22 is connected to a mixer 30 through a one-way valve 29.

A duct 31 is also in fluid communication with mixer 30 and is connected, through a flow regulator 32, to the outlet 33 of the reservoir 28, which also has a vent 34.

The mixer 30 has a delivery duct 35 which is controlled by a gas analyzer 36, which in turn is connected, with interposition of an electric flow control valve 37, to the intake of a compressor 38 of suitable power, which is designed to compress to a preset pressure the gas mixture fed to it by the is mixer 30.

The delivery 39 of the compressor 38 is connected, either directly or through a reservoir 40, to one or more users (in the present case through a multiple-way electric valve 41), which in the drawing have been schematically shown as a tire changing machine 42, on which a tire 43 to be inflated rests, and as an inflation cage 42a, both of which are of any suitable type. Of course, upstream of each user there is provided a pressure gauge 44 for measuring the inflation pressure, as it is well known in the art.

The electric valves 32, 37 and 41, the gas analyzer 36 and the pressure gauges 44 are electrically connected to program control means, such as a microprocessor 45 arranged to process the input data from one or more keyboards 46, from a database 47, which stores information on inflation parameters of all or part of commercially available tire types, from a possible thermometer 48 and pressure gauge 49 for detecting ambient pressure and temperature in order to perform processing and issue control signals suitable for selectively driving the electric valves 32, 37, 41.

The operation of the device 21 for program-controlled variation of the composition of a gaseous mixture for inflating a tire is very simple and safe. By using a keyboard 46, the identification data as to the type of tire 43 to be inflated are fed to the microprocessor 45. The microprocessor 45 queries the database 47 and processes optimum composition of the nitrogen/oxygen mixture at the recommended (programmed) inflation pressure.

The analyzer 36 provides the microprocessor with the composition of the mixture available in the mixer 30, and if said composition differs from that stored for a specific tire to be inflated, the flow regulator 32 is controlled so as to meter the delivery of oxygen into the nitrogen coming from the separator 23, whereby oxygen is present in a preset percentage (by volume). Only at this point does the electric valve 37 open for supplying the compressor 38 which is then started in order to supply the mixture at the preset pressure to the tire changing machine or to the inflation cage, depending upon the controlled configuration of the electric valve 41.

In this manner, the tire 43 is inflated by varying the composition of the inflation air according to the inflation pressure recommended for a given tire and optionally according to other parameters which are typical of the specific tire 43 to be inflated.

In general, the percentage of oxygen ($O_2$) that is present in the inflation mixture should decrease as the specific inflation pressure for a given tire rises.

The above described invention is susceptible of numerous modifications and variations within the protection scope as defined by the tenor of the claims.

In a simplified embodiment of the device 1, user 22 and/or 22a is supplied with gaseous mixture directly coming from the mixer 10, said mixture being already brought to a preset pressure by the compressor 5.

Upstream of each user there are provided, preferably combined into a single analog/digital gauge, a pressure gauge 24 and a gas analyzer 16 for measuring the pressure and the composition of the inflation mixture, respectively.

The additional gas reservoir 8 is then connected to each user through a bypass duct, which can be provided with flow control means in order to manually control the concentration of additional gas in the inflation mixture.

This embodiment of the device 1 is, from a functional point of view, simpler than the preceding one, since direct intervention of the operator is required for monitoring the values indicated on the pressure gauge and the gas analyzer and for taking action through flow control means in case of discrepancy with the preset values for each tire.

The above cited flow control means can be constituted simply by an on/off switch, by which the operator can control the microprocessor to detect pressure and composition values, thus starting the mixture control process until the difference between ideal composition and the real inflation composition is deemed to be acceptable.

The disclosures in Italian Patent Application No. VR99A000061 from which this application claims priority are incorporated herein by reference.

What is claimed is:

1. A tire inflator, comprising a compressor, at least one inflating nozzle or gun arranged to be connected to an inflation inlet for a tire, a source of deoxygenated or oxygen-depleted air located upstream of said compressor and downstream of said inflation nozzle or nozzles, and means for changing the composition of the air used to inflate the tire according to a preset inflation pressure for the tire including means for decreasing the percentage of oxygen ($O_2$) as the inflation pressure required for the tire increases.

2. The inflator according to claim 1, wherein said source of deoxygenated or oxygen-depleted air comprises at least one membrane separator.

3. The inflator according to claim 1, comprising a store reservoir for deoxygenated or oxygen-depleted compressed air located between said source and each inflating nozzle or gun.

4. A tire changing machine, provided with, or comprising or being connectable to, a tire inflator according to claim 1.

5. The tire changing machine according to claim 4, wherein deoxygenated or oxygen-depleted compressed air coming from said source is used.

6. An inflation cage, provided with, or comprising or being connectable to, a tire inflator according to claim 1.

7. An inflation method, wherein the composition of the air used to inflate a tire is changed according to a preset inflation pressure for said tire, and comprising decreasing the percentage of oxygen ($O_2$) as the inflation pressure required for the tire increases.

8. A device for program-controlled variation of the composition of a gaseous mixture for inflating a tire wherein the composition of the air used to inflate said tire is changed according to a preset inflation pressure for said tire, compromising a first source of at least one main gas, a second source of at least one additional gas, at least one first compressor suitable for compressing to a preset pressure a gaseous mixture of at least said main gas and additional gas, at least one dispenser of compressed mixture which is connected to the delivery of said compressor, and comprising at least one mixer for said at least one main gas and said at least one additional gas which is suitable for delivering a gaseous mixture having a desired composition, a gas analyzer means arranged to control said valve means in response to control signals from said analyzer means.

9. The device according to claim 8, wherein said control means comprises a computer provided with a database and at least one access keyboard for entering parameters characteristic of a tire to be inflated for specific metering of the optimum mixture for inflating it.

10. The device according to claim 9, wherein said first source of main gas comprises at least one first outlet of at least one oxygen separator device and said second source of additional gas comprises at least one second outlet for said at least one oxygen separator.

11. The device according to claim 10, wherein said first and second outputs of said oxygen separator is connected, through a one-way valve, to said mixer through a reservoir for said additional gas, said reservoir being connected to said mixer through a flow regulator.

12. The device according to claim 11, comprising a connecting duct between said mixer and at least one user, and a pressure gauge and an analyzer means for analyzing the composition of said gaseous mixture which are connected to said program-regulated control means and arranged upstream of said at least one user.

13. The device according to claim 12, comprising a bypass duct between said reservoir for said additional gas and each user.

14. The device according to claim 13, wherein said bypass duct is provided with flow control means for manual control of the concentration of said additional gas.

15. The device according to claim 11, wherein said mixer comprises an outlet duct which is controlled by said gas analyzer and an electric flow-control valve for said outlet duct suitable for distributing the delivery mixture to users.

16. The device according to claim 15, comprising downstream of said electric flow control valve, a second compressor arranged to further compress said gaseous mixture from said first compressor up to a preset pressure, and to feed a reservoir for said mixture at utilization pressure.

17. The device according to claim 8, wherein said program control means comprises a microprocessor having an access keyboard and a database for stored data.

18. The device according to claim 17, wherein said microprocessor has its input connected to a pressure gauge and to a thermometer for detecting ambient pressure and temperature.

* * * * *